United States Patent [19]

Billenstein et al.

[11] Patent Number: 4,465,817

[45] Date of Patent: Aug. 14, 1984

[54] MODIFIED ETHERIFIED PHENOL/ALDEHYDE CONDENSATION PRODUCTS AND THEIR USE FOR BREAKING PETROLEUM EMULSIONS

[75] Inventors: Siegfried Billenstein; Fritz J. Gohlke, both of Burgkirchen/Alz; Martin Hille, Liederbach; Roland Böhm, Kelkheim, all of Fed. Rep. of Germany

[73] Assignee: Hoechst Aktiengesellschaft, Fed. Rep. of Germany

[21] Appl. No.: 507,173

[22] Filed: Jun. 23, 1983

[30] Foreign Application Priority Data

Jun. 25, 1982 [DE] Fed. Rep. of Germany ....... 3223691

[51] Int. Cl.$^3$ ............................................. C08L 61/08
[52] U.S. Cl. .................... 525/507; 252/331; 252/358; 528/129
[58] Field of Search .............. 525/507, 405; 252/331, 252/358; 528/107, 129

[56] References Cited

U.S. PATENT DOCUMENTS 4,117,031 9/1978 Macenka et al. .................... 525/405

*Primary Examiner*—Theodore E. Pertilla
*Attorney, Agent, or Firm*—Connolly and Hutz

[57] ABSTRACT

The new petroleum breakers are obtained by subjecting (a) an addition reaction product which has been obtained by reacting aliphatic aldehydes with phenol in a molar ratio of 1:1 to 3:1 at temperatures of 50° to 80° C. in the presence of an alkaline catalyst, to a condensation reaction at 80° to 150° C., after prior neutralization and, if appropriate, in the presence of inert solvents, with (b) a block polymer which has been prepared by reacting polypropylene glycols having molecular weights of 1,300 to 3,000 with 20 to 100% by weight of ethylene oxide in the presence of alkaline catalysts, in a ratio of 0.5 to 4 moles of (a) to 1 mole of (b), and removing the water of the reaction which is formed, and (c) adding on 10 to 400 g of propylene oxide, relative to 100 g of condensation product, or 10 to 200 g of ethylene oxide and propylene oxide in a ratio of 1:0.5 to 14, relative to 100 g of condensation product, in an addition reaction, to the etherified phenol/aldehyde condensation product thus obtained. When used for separating petroleum emulsions, they effect, in particular, a high and rapid removal of salt.

6 Claims, No Drawings

MODIFIED ETHERIFIED PHENOL/ALDEHYDE CONDENSATION PRODUCTS AND THEIR USE FOR BREAKING PETROLEUM EMULSIONS

The invention relates to modified, etherified phenol/aldehyde condensation products. It also relates to a process for separating petroleum emulsions, particularly those of the water-in-oil type, using these condensation products.

Etherified phenol/aldehyde condensation products for breaking crude oil emulsions (petroleum emulsions) are described in German Patent No. 2,445,873 and the corresponding U.S. Pat. No. 4,117,031. These condensation products are prepared by subjecting (a) an addition reaction product which has been obtained by reacting aliphatic aldehydes with phenol in a molar ratio of 1:1 to 3:1 at temperatures of 50° to 80° C. in the presence of an alkaline catalyst, to a condensation reaction at 80° to 150° C., after prior neutralization and, if appropriate, in the presence of inert solvents, with (b) a block polymer which has been prepared by reacting polypropylene glycols having molecular weights of 1,500 to 2,500 with 30 to 50% by weight of ethylene oxide in the presence of alkaline catalysts, in a ratio of 0.5 to 4 moles of (a) to 1 mole of (b), and removing the water of the reaction which is formed.

Petroleum breakers should, in particular, have a spontaneous initial breaking action and a short total separation time, and should result in a separation of water and removal of salt which is as complete as possible. All this should be achieved independently of the nature (origin) of the crude oil, at a relatively low petroleum treatment temperature and using a relatively small quantity of the breaker. Although the etherified phenol/aldehyde condensation products known from German Patent No. 2,445,873 and U.S. Pat. No. 4,117,031 are relatively good petroleum breakers, they still leave something to be desired in respect of the fulfilment of the requirements mentioned.

It has now been found, surprisingly, that the effectiveness of etherified phenol/aldehyde condensation products for breaking petroleum emulsions can be increased substantially if they are reacted with ethylene oxide and propylene oxide, or with propylene oxide alone, i.e. if propylene oxide, or ethylene oxide and propylene oxide are added on to these products by an addition reaction.

The etherified phenol/aldehyde condensation products which have been modified in accordance with the invention are, accordingly, products which have been prepared by subjecting (a) an addition reaction product which has been obtained by reacting aliphatic aldehydes with phenol in a molar ratio of 1:1 to 3:1 at temperatures of 50° to 80° C. in the presence of an alkaline catalyst, to a condensation reaction at 80° to 150° C., after prior neutralization and, if appropriate, in the presence of inert solvents, with (b) a block polymer which has been prepared by reacting polypropylene glycols having molecular weights of 1,300 to 3,000 with 20 to 100% by weight of ethylene oxide in the presence of alkaline catalysts, in a ratio of 0.5 to 4 moles of (a) to 1 mole of (b), and removing the water of the reaction which is formed, and (c) adding on 10 to 400 g of propylene oxide, relative to 100 g of condensation product, or 10 to 200 g of ethylene oxide and propylene oxide in a ratio of 1:0.5 to 14, relative to 100 g of condensation product, in an addition reaction, to the etherified phenol/aldehyde condensation product thus obtained.

The etherified phenol/aldehyde condensation products obtained by means of stages (a) and (b) are, in principle, described in detail in the above-mentioned publications, so that reference can be made to these publications in this respect. The preliminary products according to (a) are prepared in a manner known per se by an addition reaction between aliphatic aldehydes, preferably formaldehyde and acetaldehyde, especially formaldehyde, and phenol in the presence of alkaline catalysts at temperatures of 50° to 80° C., preferably 55° to 70° C. The only important point in this reaction is that these temperatures should not be exceeded appreciably, since otherwise condensation reactions leading to resol-like or novolak-like products can take place, with loss of hydroxyl groups. The molar ratio between phenol and aldehyde is 1:1 to 1:3, preferably 1:1.8 to 1:2.2. Examples of suitable alkaline catalysts are sodium hydroxide, sodium alcoholates, such as sodium methylate, sodium carbonate, calcium hydroxide and the corresponding potassium compounds and also tertiary amines, such as triethylamine, sodium hydroxide, potassium hydroxide and sodium alcoholates being preferred. The quantity of alkaline catalyst is, in general, 0.3 to 5% by weight, preferably 1 to 3% by weight, relative to the quantity of phenol employed. The formaldehyde is advantageously employed in the form of a 35% strength by weight aqueous formaldehyde solution or in the form of para-formaldehyde.

The preparation of the preliminary products according to (b) is effected in a known manner by an addition reaction between ethylene oxide and polypropylene glycols in the presence of alkaline catalysts, preferably potassium hydroxide or sodium hydroxide. Polypropylene glycols having molecular weights of 1,300 to 3,000, preferably 1,500 to 2,500, are used as starting materials here and are reacted with 20 to 100% by weight, preferably 30 to 80% by weight, of ethylene oxide, relative to the polypropylene glycol. The quantity of catalyst is, in general, 0.1 to 2% by weight, preferably 0.2 to 1% by weight, relative to the polypropylene glycol. The temperature in the addition reaction is, in general, 110° to 160° C., preferably 130° to 150° C.

The subsequent etherification of the alkaline reaction products according to (a) and (b) is carried out after prior neutralization with suitable acids, if appropriate in the presence of inert solvents, at reaction temperatures of 80° to 150° C., preferably 100° to 130° C., with simultaneous removal of the water of reaction formed, for example by applying a vacuum or by azeotropic distillation. 0.5 to 4 moles of (a), preferably 1 to 3 moles of (a), react with 1 mole of (b). Mineral acids, such as hydrochloric acid, sulfuric acid and phosphoric acid, or organic acids, such as acetic acid, can be employed for the neutralization. Suitable inert solvents are preferably toluene and xylene.

The etherified phenol/aldehyde condensation product obtained from reaction stages (a) and (b) is, in accordance with the invention, propoxylated with 10 to 400 g, preferably 20 to 200 g, of propylene oxide per 100 g of condensation product or is ethoxylated and propoxylated with 10 to 200 g, preferably 20 to 100 g, of ethylene oxide and propylene oxide per 100 g of condensation product, the ratio (ratio by weight) of ethylene oxide to propylene oxide being 1:0.5 to 14, preferably 1:1 to 8.

The actual oxalkylation (additional oxalkylation) according to the invention is carried out, in principle, by the procedure known for the oxalkylation of, for example, alcohols, glycols or amines. It is advantageous to use a procedure in which the etherified phenol/aldehyde condensation product is employed as such or dissolved in an organic solvent, preferably toluene or xylene. In general, the solution is 10 to 80% strength by weight, preferably 30 to 60% strength by weight. Oxalkylation is carried out in the presence of alkaline catalysts, such as sodium hydroxide, sodium carbonate, sodium alcoholates, such as sodium methylate, calcium hydroxide, the corresponding potassium compounds and tertiary amines, such as triethylamine, preferably sodium hydroxide, potassium hydroxide and sodium alcoholate, by metering the epoxide into the condensation product employed, in general within a period of 1 to 8 hours. The quantity of catalyst is, in general, 0.2 to 5% by weight, preferably 0.5 to 3% by weight, relative to the quantity of condensation product employed. In general, the reaction temperature is 90° to 160° C., preferably 110° to 140° C. The pressure during the oxalkylation reaction is, as a rule, 30 to 500 kPa. When the pressure falls to less than about 30 kPa, this indicates the end of the reaction, namely the propylene oxide addition reaction or the ethylene oxide and propylene oxide addition reaction. In the addition reaction with ethylene oxide and propylene oxide, both epoxides can be employed simultaneously or successively. Of the oxalkylation reactions according to the invention, propoxylation is preferred.

The products according to the invention are yellow to brown liquids of varying viscosity. In the process according to the invention for separating petroleum emulsions, the new products are added to the emulsions, which are subjected to agitation, in an amount of 1 to 100 g per tonne, preferably 5 to 50 g per tonne. In this process, they can be employed as such or dissolved in a solvent. Suitable solvents are water, alcohols, such as methanol, isopropanol and isobutanol, aromatic hydrocarbons, such as benzene, toluene and xylene, and commercially available mixtures of higher aromatics.

The new products are very effective breakers for petroleum emulsions, preferably those of the water-in-oil type. As a result of the additional oxalkylation according to the invention, the effectiveness of etherified phenol/aldehyde condensation products, such as have been described, for example, in German Patent No. 2,445,873 and in the corresponding U.S. Pat. No. 4,117,031, is increased to an unexpectedly high extent, particularly in the case of highly saline types of petroleum (i.e. types of petroleum having a relatively large content of sodium chloride). The breakers according to the invention thus effect a very good separation of water and removal of salt. A particularly low content of residual water and residual salt is thus achieved when they are used.

The invention will now be illustrated in greater detail by means of examples.

Preparation of the petroleum breakers according to the invention

EXAMPLE 1

Preparation of the preliminary product (a): 94.1 g of phenol (1.00 mole) and 3.1 g of 50% strength by weight sodium hydroxide solution (1.6% by weight of sodium hydroxide, relative to phenol) are initially placed in a stirred flask. 171 g (2.00 moles) of formaldehyde, in the form of a 35% strength by weight aqueous solution, are then metered in at 55° to 60° C. and while stirring. The mixture is then stirred at 70° C. until the content of free formaldehyde is less than 2% by weight. A red-brown liquid of low viscosity is present.

Preparation of the preliminary product (b) and its reaction with (a): 400 g of polypropylene glycol having an average molecular weight of 1,700 are dried for 2 hours at 110° C. and under a water pump vacuum in the presence of 2.5 g (0.6% by weight, relative to the polypropylene glycol) of 85% strength by weight potassium hydroxide. 172 g of ethylene oxide (43% by weight, relative to the polypropylene glycol) are then reacted at 130° to 140° C. When the oxethylation is complete, a colorless liquid of medium viscosity is present. For the etherification of (a) with (b), 80 g (0.30 mole) of (a) are mixed with 486 g (0.20 mole) of the preliminary product (b), and the mixture is neutralized with dodecylbenzenesulfonic acid (the molar ratio of (a) to (b) is 1.5:1). The free water present in the mixture is removed by distillation in a vacuum of about 2,000 mPa, up to a temperature of 80° to 85° C. The etherification reaction is then carried out by increasing the reaction temperature to 140° C., and the water of reaction formed is simultaneously removed in vacuo. A red-brown, viscous liquid is present.

Oxpropylation: 1.6 g (0.5% by weight, relative to the condensation product) of 85% strength by weight potassium hydroxide are added to 325 g of the resulting phenol/aldehyde condensation product in a stirred pressure vessel. The mixture is kept at 110° to 120° C. and under a vacuum of about 2,000 mPa for 2 hours, while stirring, and is thereby dried. 107 g of propylene oxide are then metered in at 120° to 130° C. and under a pressure of 50 to 500 kPa within a period of 3 hours (this corresponds to 33 g of propylene oxide per 100 g of condensation product). When the propylene oxide has reacted completely, the end product is present in the form of a dark liquid of medium viscosity.

EXAMPLE 2

Preliminary product (a) from Example 1

Preparation of the preliminary product (b) and its reaction with (a): 500 g of polypropylene glycol having an average molecular weight of 2,000 are dried for 2 hours at 100° C. and under a water pump vacuum in the presence of 1.6 g (0.3% by weight, relative to the polypropylene glycol) of 85% strength by weight potassium hydroxide. 190 g of ethylene oxide (38% by weight, relative to the polypropylene glycol) are then metered in at 130° to 150° C. When the oxethylation is complete, a slightly yellow liquid of medium viscosity is present. For the etherification of (a) with (b), 107 g (0.40 mole) of the preliminary product (a) are mixed with 560 g (0.20 mole) of the preliminary product (b) in a stirred flask, and the mixture is neutralized with phosphoric acid (the molar ratio of (a) to (b) is 2:1). The mixture is heated as in Example 1 and the etherification reaction is carried out with removal of water. The product is diluted with 600 g of xylene and is then present in the form of a 50% strength by weight xylene solution.

Oxalkylation: 2.5 g (1.0% by weight, relative to the condensation product) of 85% strength by weight potassium hydroxide powder are added to 520 g of the 50% strength by weight xylene solution of the phenol/aldehyde condensation product in a stirred pressure vessel; the mixture is kept for 2 hours at a reflux temperature of about 140° C., and the water present is removed by distillation, using xylene as the entraining agent. A mixture of 130 g of ethylene oxide and 130 g of propylene oxide is then metered in in the course of 4 hours at 125° to 145° C. and under a pressure of 50 to 500 kPa (this corresponds to 100 g of epoxide, in a 1:1 ratio by weight of ethylene oxide to propylene oxide, per 100 g of solvent-free condensation product). The end product is a 67% strength by weight, dark solution of the oxalkylate in xylene.

EXAMPLES 3 TO 6

These examples are carried out analogously to Example 1. The variations made compared with Example 1 are summarized below. For reasons of clarity, the summary also contains the conditions in Examples 1 and 2 which correspond to the variations in Examples 3 to 6.

Summary of Examples 3 to 6

| Example | Preliminary product (a), molar ratio of aldehyde to phenol | Preliminary product (b) Polypropylene glycol molecular weight | % by weight of ethylene oxide, relative to the polypropylene glycol | Condensation product formed from (a) and (b), molar ratio of (a) to (b) | Oxalkylation, grams of epoxide per 100 g of condensation product |
|---|---|---|---|---|---|
| 1 | 2:1 | 1,700 | 43 | 1.5:1 | 33 g of propylene oxide |
| 2 | 2:1 | 2,000 | 38 | 2:1 | 50 g of ethylene oxide and 50 g of propylene oxide |
| 3 | 2:1 | 2,000 | 60 | 1.5:1 | 194 g of propylene oxide |
| 4 | 1.5:1 | 1,500 | 60 | 4:1 | 400 g of propylene oxide |
| 5 | 2.5:1 | 2,500 | 25 | 1:1 | 130 g of propylene oxide |
| 6 | 2.2:1 | 3,000 | 100 | 3:1 | 20 g of propylene oxide |

The use of the petroleum breakers according to the invention

The examples which follow show the surprisingly great effect of the new breakers with a petroleum having a relatively large content of sodium chloride under various demulsification conditions. The percentages indicated in the examples are percentages by weight.

EXAMPLE 7

Crude oil from North Germany

Sodium chloride content: 13.2%
Water content: 42%
Demulsification temperature: 50° C.
Quantity added: 30 ppm of active substance

| Type of breaker | % separation of water after | | | | % residual salt content in the oil phase |
|---|---|---|---|---|---|
| | 40' | 60' | 90' | 240' | |
| Product from Example 1 | 0 | 30 | 92 | 96 | 0.24 |
| Product from Example 3 | 5 | 92 | 94 | 98 | 0.27 |
| Non-propoxylated condensation product from Example 1 | 5 | 13 | 20 | 55 | 5.94 |
| Non-propoxylated condensation product from Example 3 | 11 | 24 | 33 | 74 | 3.14 |
| Blank value | 0 | 0 | 0 | 0 | 13.2 |

EXAMPLE 8

Crude oil from North Germany

Sodium chloride content: 3.8%
Water content: 48%
Demulsification temperature: 30° C.
Quantity added: 100 ppm of active substance

| Type of breaker | % separation of water after | | | | | | % water content in the oil phase (after 6 h) |
|---|---|---|---|---|---|---|---|
| | 0.5 h | 1 h | 2 h | 4 h | 6 h | 24 h | |
| Product from Example 2 | 0 | 0 | 2 | 5 | 15 | 80 | 2.9 |
| Non-oxalkylated condensation product from Example 2 | 4 | 8 | 12 | 38 | 50 | 64 | 18.7 |
| Product from Example 3 | 42 | 68 | 94 | 96 | 98 | 100 | 0.04 |
| Product from Example 4 | 0 | 4 | 8 | 24 | 90 | 96 | 0.23 |
| Non-oxalkylated condensation product from Example 4 | 0 | 4 | 12 | 38 | 50 | 64 | 19.4 |
| Product from Example 5 | 2 | 6 | 48 | 98 | 100 | 100 | 0.5 |
| Non-oxalkylated condensation product from Example 5 | 1 | 4 | 12 | 42 | 76 | 84 | 10 |
| Blank value | 0 | 0 | 0 | 2 | 4 | 6 | 36.8 |

We claim:
1. A modified etherified phenol/aldehyde condensation product which has been prepared by subjecting
   (a) an addition reaction product which has been obtained by reacting aliphatic aldehydes with phenol in a molar ration of 1:1 to 3:1 at temperatures of 50° to 80° C. in the presence of an alkaline catalyst, to a condensation reaction at 80° to 150° C., after prior neutralization and, if appropriate, in the presence of inert solvents, with (b) a block polymer which has been prepared by reacting polypropylene glycols having molecular weights of 1,300 to 3,000 with 20 to 100% by weight of ethylene oxide in the presence of alkaline catalysts, in a ratio of 0.5 to 4 moles of (a) to 1 mole of (b), and removing the water of the reaction which is formed, and (c) adding on 10 to 400 g of propylene oxide, relative to 100 g of condensation product, or 10 to 200 g of ethylene oxide and propylene oxide in a ratio of 1:0.5 to 14, relative to 100 g of condensation product, in an addition reaction, to the etherified phenol/aldehyde condensation product thus obtained.

2. A product as claimed in claim 1, wherein formaldehyde is employed as the aliphatic aldehyde for the preparation of (a).

3. A product as claimed in claim 1, wherein the molar ratio of aldehyde to phenol in the preparation of (a) is 1.8:1 to 2.2:1.

4. A product as claimed in claim 1, wherein the block polymer (b) is prepared from a polypropylene glycol having a molecular weight of 1,500 to 2,500 and 30 to 80% by weight of ethylene oxide.

5. A product as claimed in claim 1, wherein (a) is subjected to a condensation reaction with (b) in a ratio of 1 to 3:1.

6. A product according to claim 1, wherein 20 to 200 g of propylene oxide are added on, by means of an addition reaction, to the etherified phenol/aldehyde condensation product obtained from (a) and (b).

* * * * *